EFFECT BY THE ADDITION OF DICYCLOPENTADIENYL TITANIUM

EFFECT BY THE ADDITION OF DIALKYL ZINC

EFFECT OF THE MELT INDEX OF THE POLYMER BY THE CONCENTRATION OF $Zn(C_2H_5)_2$

United States Patent Office 3,399,184
Patented Aug. 27, 1968

3,399,184
PROCESS FOR PRODUCING HIGH POLYMERS OF ALPHA - OLEFINS AND CATALYST COMPOSITIONS THEREFOR
Keiichi Azuma, Kazuo Shikata, and Kaiji Yokokawa, Tokuyama-shi, Japan, assignors to Tokuyama Soda Kabushiki Kaisha, Tokuyama - shi, Yamaguchi - ken, Japan, a corporation of Japan
Filed Apr. 9, 1965, Ser. No. 446,839
Claims priority, application Japan, Apr. 13, 1964, 39/20,583; May 21, 1964, 39/28,329
6 Claims. (Cl. 260—93.7)

ABSTRACT OF THE DISCLOSURE

A novel catalyst for producing alpha-olefin high polymers which is obtained by reacting a low valent titanium halide, a polyalkylhydrosiloxane, dicyclo pentadienyl titanium, and if desirable a dialkyl zinc, and a process for producing said alpha-olefin high polymers using the above catalyst.

---

Figure 1:
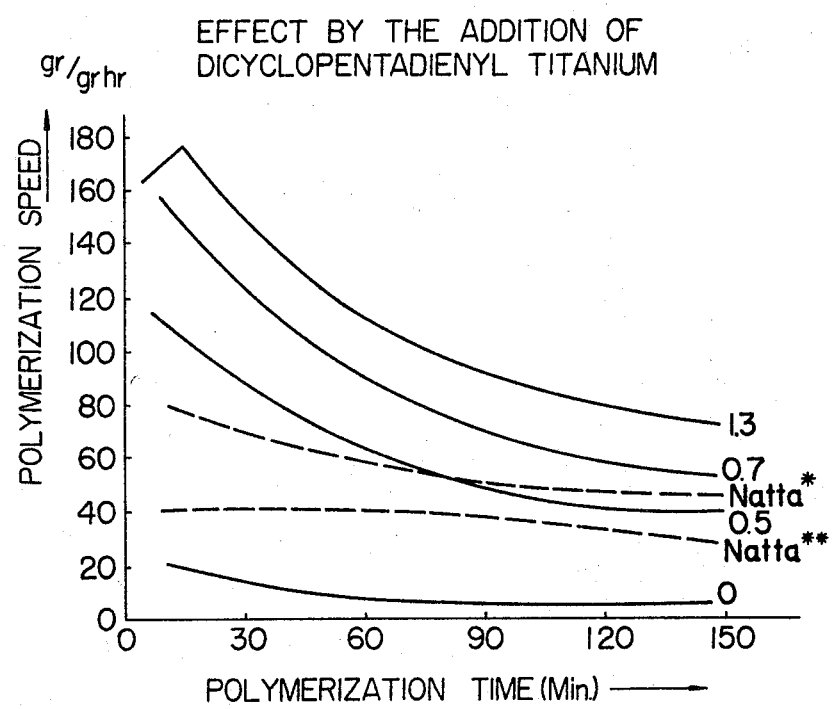

This invention relates to a process for obtaining linear polymers of high molecular weight by polymerizing or copolymerizing the hereinafter-defined alpha-olefins, using a new catalyst. The invention also relates to the new catalyst composition for polymerizing or copolymerizing alpha-olefins.

As processes for obtaining highly crystalline polymers by polymerizing the alpha-olefins such as ethylene and propylene, known are the processes which use the Ziegler-Natta type catalyst which comprises the reaction product of the halides of titanium of low valence and principally the organic aluminum compounds.

According to the present invention, it has been found however that a catalyst composition comprising either the three components of a low valent titanium halide, a polyalkylhydrosiloxane and dicyclopentadienyl titanium or the four components consisting of the foregoing three components to which has been added further a dialkyl zinc was a catalyst possessing very high polymerization activity with respect to alpha-olefins.

As regards the catalysts comprising only the compounds of Group IV of the Periodic Table, the catalysts comprising the reaction products of halides of Group IVa with organic silicon compounds containing a H-Si bond are already known.

Further, as a catalyst using only the compounds of the metals of Group IVa, the catalyst of the composition consisting of TiCl₃ and (C₅H₅)₂·Ti(CH₃)₂, as disclosed in U.S. Patent 2,992,212, is known.

Although this catalyst has relatively good polymerization activity with respect to propylene, it possesses such drawbacks as that not only the synthesis of $$(C_5H_5)_2 \cdot Ti(CH_3)_2$$

is difficult but also its instability with respect to temperature and its difficulty of handling. There is also the problem as to whether its commercial production is feasible. Hence, it is believed to possess little value as a commercial catalyst.

Besides the foregoing catalysts, there is one proposed as an improvement of the Ziegler-Natta type catalyst. This is a three-component catalyst comprising the reaction product of an organic silicon compound containing a H-Si bond, a halide of a metal of Group III of the Periodic Table (particularly aluminum trichloride) and a compound of a metal of Group IVa of the Periodic Table.

The catalyst composition according to the present invention has however a higher catalytic activity than the prior art catalysts such as described hereinbefore, and moreover polymers of alpha-olefins having higher isotacticity can be obtained by the catalyst of the present invention.

The low valent titanium halides and polyalkylhydrosiloxanes, the components making up the catalyst according to this invention, are reagents that are readily obtainable commercially. On the other hand, dicyclopentadienyl titanium can be readily synthesized by reducing dicylopentadienyl titanium dichloride in a hydrocarbon solvent using a sodium amalgam. The catalyst composition consisting of the reaction product of these three components has an activity whose duration is great as well as a fast polymerization speed. Further, the catalyst components used in this invention, except the metal halides, are all soluble in hydrocarbon solvents. Again, the fact that the procedure for synthesizing the catalyst is simple as well as that the equipment will suffice with the common agitating type satisfies the requisites of a commercial catalysts.

The following is an illustration of a process for producing the invention catalyst. First, the interior of an electromagnetic stirrer-equipped autoclave is replaced with an inert gas, after which the autoclave is charged with a solvent. Then, under an atmosphere of an inert gas, titanium trichloride, a polyalkylhydrosiloxane, and dicyclopentadienyl titanium are added in mole ratios of TiCl₃/(C₅H₅)₂Ti, 2.0–0.2 and polyalkylhydrosiloxane/(C₅H₅)₂Ti, 1–10. The polymerization speed changes with the changes in these two mole ratios. In adding the catalyst components, the dicyclopentadienyl titanium and the polyalkylhydrosiloxane may be treated in advance for 10–30 minutes at room temperature (25–30° C.) and then the titanium trichloride be added, or the three components may be together at the same time.

The present invention also includes a process for producing a four-components catalyst comprising the foregoing three components to which has also been added a small amount of a dialkyl zinc, as well as a process of producing polymers of alpha-olefins, using said catalyst. The four-components catalyst in accordance with the invention wil provide highly polymerized and highly crystalline polymers when monomers are polymerized and rubbery or block polymerized high polymers when a monomeric mixture is used. In the case of the invention catalyst composition wherein a dialkyl zinc has been incorporated, polymers of still higher crystallinity can be obtained in good yield per unit catalyst at high polymerization speeds. Preferred is the use of the dialkyl zinc in an amount such that Zn/Ti mole ratio becomes not more than 3, marked effects being had even with the use in such minute amounts as below 1.

Next, the properties of the invention catalyst composition will be compared with those of the conventional catalysts, taking, for example, the polymerization of propylene. In accordance with the polymerization process using as catalyst that comprising a titanium trichloride thermally reduced with hydrogen and triethylaluminum the average polymerization speed is 40 g./TiCl₃ g./hour and the resulting polymer exhibits an isotactic content (which is indicated by the percent boiling n-heptane extraction residue) of 80–85%. On the other hand, in the case also of a catalyst wherein as the organic aluminum compound was used diethylaluminum monochloride, the polymerization speed was 10 g./TiCl₃ g./hour and the isotactic content was about 93%.

In contrast, when TiCl₃ was used in the invention three-components catalyst, the polymerization speed was 40–50 g./TiCl₃ g./hour and the isotactic content was about 90%. Further, by the incorporation of the dialkyl zinc, the polymerization speed could be raised to 80–100 g./TiCl₃ g./hour and the isotactic content to the neighborhood of 95%. Thus, as hereinabove described, not only is the polymerization speed high when the invention catalyst is used, but also polymers of alpha-olefins having high isotactic contents can be obtained.

Although the invention catalyst shows a tendency to a somewhat rapid decline in its catalytic activity with the passage of time in polymerizing ethylene, as compared with the instances of the polymerization of alpha-olefins having 3 or more carbon atoms, it is, of course, possible to use the invention catalyst in homopolymerizing ethylene or copolymerizing ethylene with the alpha-olefins having 3 or more carbon atoms.

The behavior of the activity of the invention catalyst is as illustrated in FIG. 1. As the mole ratio of dicyclopentadienyl titanium (hereinafter abbreviated to TC) to titanium trichloride increases, the polymerization speed rises. Namely, in FIG. 1 are shown the changes in the polymerization speed with the passage of the polymerization time in polymerizing propylene, using as catalyst compositions consisting of 2 millimoles of $TiCl_3$, 6.7 millimoles Si–H compound and 1.0 millimole of $ZnR_2$, but in which the TC alone was varied so as to be respectively 0, 0.5, 0.7 and 1.3 mole times the $TiCl_3$. On the other hand, that indicated as "Natta" in the figure is a control which uses as catalyst $TiCl_3$-$AlEt_2Cl$. That marked * is the instance where hydrogen reduced $TiCl_3$ (HA-Stauffer Company product) was used, whereas that marked ** is the instance where aluminum reduced $TiCl_3$ (AA-Stauffer Company product) was used.

It can be seen from the results shown in FIG. 1 that it is preferred to use the titanium trichloride according to the invention in an amount at least 0.5 mole times, and particularly at least 0.7 mole times, the dicyclopentadienyl titanium (TC). As regards the upper limit of the amount to be used of TC, a sufficiently high polymerization speed can be obtained usually by the use of TC in an amount such that $TiCl_3$/TC is on the order of 0.2, i.e., about 5 mole times the $TiCl_3$. While the amount used of the TC can exceed this amount without any harm, the use thereof in greater amounts will be economically a disadvantage.

On the other hand, as regards the amount used of the polyalkylhydrosiloxane, nearly the maximum polymerization speed is attained by using polyalkylhydrosiloxane in a molar ratio of 1:1, based on the titanium trichloride. The use of a greater amount than that tends to enhance the duration of the catalytic activity rather than increase the polymerization speed.

Figure 2:
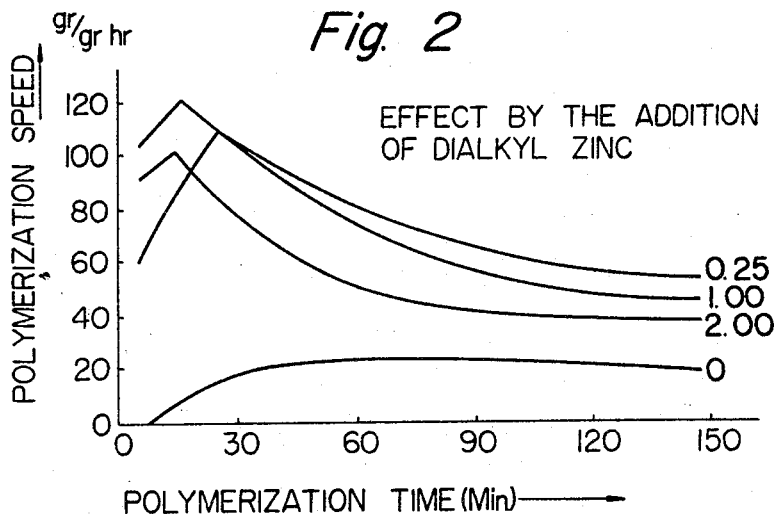

The dialkyl zinc, as used in this invention, has, on the other hand, the effect of enhancing the polymerization activity of the catalyst as well as the effect of controlling the molecular weight of the resulting alpha-olefin polymer. When considered from the aspect of polymerization activity, the use of the dialkyl zinc in an amount of less than 3 moles, based on the titanium trichloride, will do, the end being fully attained by 0.1–0.5 mole. The effect of dialkyl zinc is shown in FIG. 2. It can be seen from FIG. 2 that in the case where 2 millimoles of $TiCl_3$, 0.7 millimole of TC and 1.4 millimoles of a polyalkylhydrosiloxane have been used, a satisfactory polymerization speed can be obtained by the use of the $ZnR_2$ in an amount on the order of 0.2–2.0 millimoles, i.e., when Zn/Ti is about 0.1–1. It is, of course, possible to use a greater amount than this, there being observed a tendency to the molecular weight of the resulting polymer being controlled (decline thereof) when the $ZnR_2$ is used in a relatively large amount. However, since there will be some changes in the amounts used of the foregoing components in the invention depending upon the composition of the catalyst starting materials, the conditions of catalyst preparation and polymerization conditions, the amount used of the several components are not necessarily limited to the mole ratios hereinbefore specified.

Figure 3:
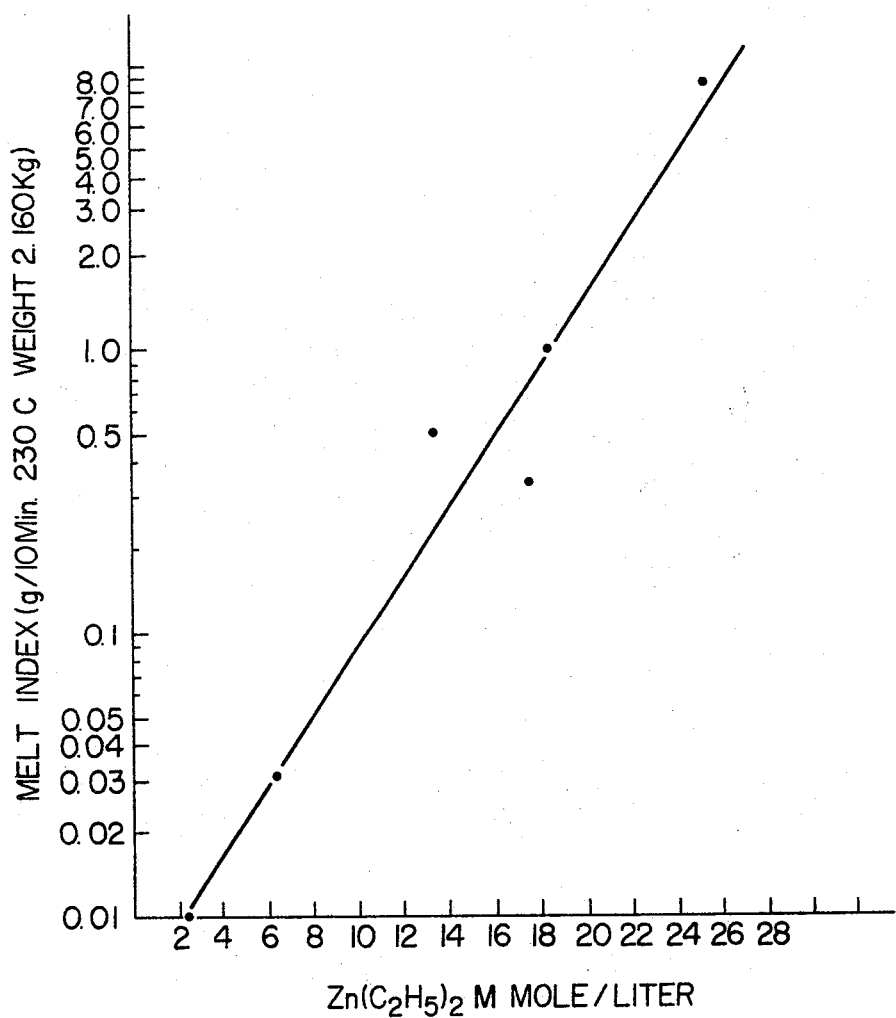

When it is contemplated to lower the molecular weight of the alpha-olefin polymer, the concentration of the dialkyl zinc in the solvent is particularly influential. As an illustration thereof, in FIG. 3 is shown by means of the melt index the relationship between the amount incorporated of the dialkyl zinc and the molecular weight of the resulting polymer.

It can be seen from this figure that the molecular weight of the resulting polymer declines as the concentration of the dialkyl zinc in the solvent rises.

When the catalyst is prepared by commonly practiced procedures, some differences in polymerization activity are observed on occasions in the catalyst system according to this invention wherein is used a dialkyl zinc, depending upon even the sequence in which the components are added. A convenient sequence of addition of the several components is that, for example, in the following method, wherein the dialkyl zinc and polyalkylhydrosiloxane are reacted for 10 minutes at 20–30° C. under an atmosphere of either an inert gas or the olefin gas used, after which the dicyclopentadienyl titanium is introduced and reacted for 10 minutes under identical conditions and thereafter the titanium trichloride is added.

Although the activity mechanism of the catalyst system of the present invention is not clear, it must basically be a three-component catalyst and for obtaining its catalytic activity the use of a low valent titanium halide, dicyclopentadienyl titanium and a compound wherein is present a Si–H bond, such as a polyalkylhydrosiloxane, is necessary. For instance, even though a polyalkylhydrosiloxane not having a Si–H bond is used under the preferred conditions of the invention process, an active catalyst cannot be obtained.

There are no special restrictions as to the procedures for carrying out the polymerization reaction using the invention catalyst system, it being possible to use, without any change, the procedures followed in the low-pressure polymerization of olefins, as customarily practiced. For example, as the polymerization temperature is used a temperature ranging from room temperature to 100° C., and preferably 50–80° C. There are no particular restrictions as to the pressure, but usually a pressure of 2–10 kg./cm.² is used.

The term "alpha-olefins," as used herein, include, e.g., ethylene, propylene, butene, styrene and butadiene. Any of these alpha-olefins can be homopolymerized or copolymerized. Copolymers are produced by adding the monomers concurrently, while by employing the known technique of introducing the several olefins alternately either random or block polymers are obtained.

As the three components of the catalyst system according to this invention, those which come respectively within the following scopes are used. Namely, as the low valent titanium halide, at least one member selected from the group consisting of titanium dichloride, titanium trichloride, titanium dibromide, titanium tribromide, titanium diiodide and titanium triiodide is used, the most effective being titanium trichloride. As methods of preparing titanium trichloride, known are the method of reducing titanium tetrachloride with hydrogen and the method of reducing titanium tetrachloride with metallic aluminum. In the latter case, it is said that a cocrystallized composition of $TiCl_3$ and $AlCl_3$ is formed. These are all referred to herein generically as titanium trichloride.

Next, the polyalkylhydrosiloxane is a silicon compound which comprises a silicon atom to which are directly bonded hydrogen and alkyl. Of the alkyl radical, that of methyl is readily available, but that of ethyl and propyl are also effective. Further, the polyalkylhydrosiloxane to be used in the invention may also be one in which a part of the alkyl radical is substituted with phenyl or a substituent phenyl. In short, so long as the polyalkylhydrosiloxane to be used in this invention is one in which the alkyl and hydrogen are bonded to at least a part of the silicon atom (Si) of the —Si—O— chain and one which is soluble in the hydrocarbon solvent to be used during the polymerization reaction, it will do.

Next, the dicyclopentadienyl titanium compound is a compound comprising a divalent titanium to which have been bonded two cyclopentadiene rings.

On the other hand, the dialkyl zinc is one in which the alkyl radical is most preferably methyl or ethyl, there being a tendency to a decrease in its effectiveness as the number of carbon atoms increases. Hence, those suitable commercially are the ones having an alkyl of 1–4 carbon atoms, dimethyl and diethyl zinc being especially useful.

For a clearer understanding of the invention, the following examples are given, it being understood that these examples are only for purpose of illustration and not in limitation of the present invention.

EXAMPLE 1

An electromagnetic stirrer-equipped 500-ml. stainless steel autoclave thoroughly replaced with ethylene in advance was charged with 150 ml. of n-heptane, 0.24 g. of polymethylhydrosiloxane (in 7.5 ml. of toluene), 1 mmol of $(C_5H_5)_2Ti$ (in 12.5 ml. of toluene) and 2.1 mmols of $TiCl_3$ (HA-Stauffer Company product) in the order given, while flowing a small amount of ethylene gas. When this was then heated immediately, the polymerization started in about 5 minutes. The polymerization temperature was maintained at 70–80° C. When the ethylene pressure became 2 kg./cm.$^2$, it was again supplied up to 6 kg./cm.$^2$, this procedure being thereafter repeated. The polymerization reaction was carried out for 2.5 hours. The polymer was treated with methanol, filtered and dried to yield 48.5 g. of a white solid polymer.

EXAMPLE 2

After stirring 0.24 g. of polymethylhydrosiloxane (in 75 ml. of toluene) and 1 mmol of $(C_5H_5)_2Ti$ (in 12.5 ml. of toluene) along with 130 ml. of n-heptane for 20 minutes at room temperature under at atmosphere of ethylene, 0.32 g. of $TiCl_3$(HA) was added. When heating was started with the ethylene pressure at 4 kg./cm.$^2$, the polymerization reaction started immediately and a drop in the ethylene pressure was noted. Thereafter the same procedures as described in Example 1 was followed. After a polymerization time of 2.3 hours, 54.0 g. of solid polymer were obtained.

On the other hand, when, instead of the $TiCl_3$ obtained by reducing titanium tetrachloride with hydrogen (hereinafter to be indicated as HA), 0.25 g. of $TiCl_2$ was used but otherwise the same procedures were followed, the polymer yield was about ⅔ of that of the instance hereinbefore described.

Control 1

Instead of the $TiCl_3$ (HA) used in Example 1, 0.50 g. of $TiCl_4$ (31.6 wt. percent thereof dissolved in toluene) was used. Otherwise the same procedures, as described in Example 1, were followed. The polymerization reactions were carried out for 2 hours respectively at 80° and 130° C., but a solid product could not be obtained.

Control 2

The same procedures as described in Example 1 were followed except that instead of the $(C_5H_5)_2Ti$ 1 mmol of $(C_5H_5)_2TiCl_2$ was used. A solid polymer could not be obtained.

Control 3

The same procedures as described in Example 1 were followed except that instead of the $(C_5H_5)_2Ti$ 1 mmol of $(C_5H_5)_2TiCl$ was used. A solid polymer could not be obtained.

EXAMPLE 3

An electromagnetic stirrer-equipped 500-ml. stainless steel autoclave provided with a pressure gauge, a thermometer, a propylene inlet line and a feeding mouth was charged under an atmosphere of an inert gas with 150 ml. of n-heptane, 0.4 ml. of polymethylhydrosiloxane, 12.5 ml. of a solution of $(C_5H_5)_2Ti$ (1 g./50 cc. in toluene), in the order given. After carrying out the reaction for about 20 minutes at 25–30° C. in a propylene atmosphere, 0.3 g. of $TiCl_3$ (HA-Stauffer Company product) was added, following the polymerization reaction was carried out by raising the temperature to 68–70° C. with stirring and with a constant propylene pressure of 5 kg./cm.$^2$. The polymerization reaction was completed with a polymerization time of 4 hours. After cooling, the resulting polymer was introduced into 200 cc. of methanol, after which it was filtered and again washed in 200 cc. of methanol and an acid solution of hydrochloric acid. The resulting polymer became a white powder, which was collected by filtration. After washing with water and drying, 59 g. of the polymer was obtained. The n-heptane extraction residue of this product was 94%.

On the other hand, when the same experiment was repeated except that 0.6 g. of $TiBr_3$ was used instead of $TiCl_3$, the yield was ⅓ of that obtained in the foregoing experiment.

EXAMPLE 4

The same procedures as described in Example 3 were followed. The polymerization of propylene was carried out using as materials making up the catalyst 0.8 g. of $TiCl_3$ (Stauffer Company–AA), 0.4 ml. of polymethylhydrosiloxane and 25 ml. of a solution of $(C_5H_5)_2Ti$ (1 g./50 cc. in toluene). 43 g. of solid polymer were obtained with a polymerization time of 1.5 hours. The n-heptane extraction residue of this product was 90.2%.

When 0.6 g. of $TiCl_2$ was used instead of the $TiCl_3$, the n-heptane extraction residue was 88%.

Control 4

Example 4 was repeated except that $(C_5H_5)_2TiCl_2$ was used instead of the $(C_5H_5)_2Ti$, but a solid polymer could not be obtained.

EXAMPLE 5

The results obtained when the polymerization reaction was carried out in accordance with the invention process similar to that described in Example 3 and by using the same polymerization equipment and solvent and under identical conditions except that a catalyst of the so-called Ziegler-Natta type was used are shown in Table I, below.

TABLE I

| | | Polymerization Conditions | | | | Polymer Properties | | | | |
|---|---|---|---|---|---|---|---|---|---|---|
| | Catalyst Components | Temp., ° C. | Time, hr. | Propylene Pressure, kg./cm.$^2$ | n-Heptane Amount, cc. | MI* | Yield Strength, kg./cm.$^2$ | Shrinkage, Percent | ($\eta$) | n-Heptane Residue, Percent |
| An example of the invention catalyst. | TiCl$_3$(HA), 0.32 g. <br> Si compound, 0.4 g. <br> (C$_5$H$_5$)$_2$Ti, 0.13 g. | 67±2.5 | 4.0 | 5.0 | 200 | 0.01 | 248 | 48 | 7.0 | 93.4 |
| Ziegler-Natta type catalyst. | TiCl$_3$(AA), 0.38 g. <br> AlClEt$_2$ <br> Al/Ti mole ratio=2 | 67±2.5 | 4.0 | 4.0 | 200 | 0.01 | 239 | 44 | 7.73 | 94.7 |

*MI=Melt index.

EXAMPLE 6

In Tables II and III, below, are shown respectively the results obtained when ethylene and propylene were polymerized by means of the invention catalyst and when polymerized by processes other than that of the present invention (a catalyst not using TC).

TABLE II.—RESULTS OBTAINED WHEN ETHYLENE WAS POLYMERIZED

| | Catalyst components, mol | | | Polymerization conditions | | | | Polymerization results, g. | |
|---|---|---|---|---|---|---|---|---|---|
| | $TiCl_n$ | Silicon compound | Additive | Solvent, ml. | Pressure, atm. | Temperature, °C. | Time, hr. | Oily Product | Solid polymer |
| Invention catalyst. | $TiCl_3$, 0.0043 | Polymethylhydrosiloxane, 0.0067. | $(C_5H_5)_2Ti$, 0.002 | n-Heptane, 150 | 2-5 | 70-80 | 2.5 | 0 | 78 |
| | $TiCl_3$, 0.0021 | Polymethylhydrosiloxane, 0.0033. | $(C_5H_5)_2Ti$, 0.002 | n-Heptane, 150 | 2-5 | 70-80 | 2.3 | 0 | 54 |
| | $TiCl_3$, 0.0043 | | $(C_5H_5)_2Ti$ 0.002 | do | 2-5 | 70-80 | 2.0 | 0 | 15 |
| | $TiCl_3$, 0.0043 | Polymethylhydrosiloxane, 0.0067. | | do | 2-5 | 70-80 | 2.0 | 0 | 0 |
| Control 5 | $TiCl_3$, 0.06 | Dimethyl-phenyl-silane, 0.12. | | 60-80° C. fraction refined oil, 200. | 50 | 100 | 6 | 2.6 | 7.0 |
| | $TiCl_4$, 0.06 | do | | do | 50 | 100 | 6 | 0 | 170 |
| Control 6 | $TiCl_4$, 0.01 | Polymethylhydrosiloxane, 0.166. | $AlCl_3$, 0.023 | 200 | Atm. | 85 | 3 | 0 | 98 |

TABLE III.—RESULTS OBTAINED WHEN ETHYLENE WAS POLYMERIZED

| | Catalyst components, mol | | | Polymerization conditions | | | | Polymerization results, g. | |
|---|---|---|---|---|---|---|---|---|---|
| | $TiCl_n$ | Silicon compound | Additive | Solvent, ml. | Pressure, atm. | Temperature, percent | Time, hr. | Oily Product | Solid polymer |
| Invention catalyst. | $TiCl_3$, 0.0043 | Polymethylhydrosiloxane, 0.0067. | $(C_5H_5)_2Ti$, 0.002 | n-Heptane, 158 | 5 | 68-70 | 2.0 | 0 | 43 |
| | $TiCl_3$, 0.0023 | Polymethylhydrosiloxane, 0.00134. | $(C_5H_5)_2Ti$, 0.001 | do | 5 | 68-70 | 4.0 | 0 | 62.4 |
| Control 7 | $TiCl_3$, 0.06 | Dimethylphenyl-silane, 0.12. | | 200 | (¹) | 100 | 6 | 18.8 | 2.2 |
| | $TiCl_3$, 0.08 | Trimethylsilane, 0.16. | | 200 | (¹) | 100 | 6 | 0 | 9 |
| Control 8 | $TiCl_3$, 0.0065 | Polymethylhydrosiloxane, 0.14. | $AlCl_3$, 0.0075 | 70-80° C. fraction ligroin, 150. | (²) | 115-120 | (²) | 0 | (³) |
| | $TiCl$, 0.0042 | do | $AlCl_3$, 0.0075 | do | (²) | 115-120 | (²) | 0 | (³) |
| Control 9 | $TiCl_3$, 0.0043 | | $(C_5H_5)_2Ti$, 0.002 | n-Heptane, 150 | 5 | 68-70 | 3.0 | 0 | (⁴) |

¹ Propylene, 350g.  ² Unknown.  ³ Viscous, sticky, rubbery substance. Yield unknown.  ⁴ Small amount.

EXAMPLES 7–11

An electromagnetic stirrer-equipped 500-ml. stainless steel autoclave was charged with 200 ml. of n-heptane, after which 0.12 g. of $ZnEt_2$, 0.4 g. of polymethylhydrosiloxane (Dow product DC-1107; hereinafter abbreviated to DC), 0.13 g. of $(C_5H_5)_2Ti$ and 0.32 g. of $TiCl_3$ (HA) were introduced under an atmosphere of either an inert gas or the olefin gas used. The reaction was then carried out for 2.5 hours at a polymerization temperature of 70° C. with a constant propylene pressure of 5 kg./cm.² After washing the resulting polymer with methanol, it was washed further with methanol and hydrochloric acid, followed by filtration and drying to yield a white powdery polymer.

This example shows a comparison of the catalytic activity and the sequence of addition of the various components. First the components included in the parentheses below were reacted for about 10 minutes at 20–30° C., then the rest of the components were added to this reaction mixture and reacted for about 10 minutes at 20–30° C. The results are shown in Table IV, wherein DC, TC and $ZnEt_2$ denote polymethylhydrosiloxane, dicyclopentadienyl titanium and diethyl zinc, respectively.

TABLE IV

| Example | Addition Sequence | Polymer, g. | Polymer, g./$TiCl_3$, g./Time | n-Heptane Extraction Residue, percent | Yield Strength, kg./cm.² | η* |
|---|---|---|---|---|---|---|
| 7 | (DC-TC-$TiCl_3$)-$ZnEt_2$ | 46.0 | 57.5 | 95.2 | 267 | 4.2 |
| 8 | (DC-$ZnEt_2$)-TC-$TiCl_3$ | 49.9 | 62.4 | 95.5 | 285 | 4.6 |
| 9 | (DC-$ZnEt_2$-TC)-$TiCl_3$ | 32.5 | 40.6 | 94.9 | 255 | 4.2 |
| 10 | (DC-TC)-$TiCl_3$-$ZnEt_2$ | 35.4 | 44.3 | 95.3 | | 3.8 |
| 11 | (DC-TC)-$TiCl_3$ | 10.5 | 16.4 | 92.5 | | 5.5 |

*η denotes the intrinsic viscosity measured in tetrolin at 135° C.

EXAMPLE 12–16

The same procedures as described in Example 7 were followed, except that the catalyst was synthesized by a method wherein the sequence of addition of the components was that in which the DC and $ZnEt_2$ were reacted first, followed by the addition of the $(C_5H_5)_2Ti$ and $TiCl_3$. The relationship between the quantitative change of the diethyl zinc, and the propylene polymerization speed and polymer properties are shown in Table V, below. From Table V it can be seen that there exists an inverse relationship between the dialkyl zinc concentration and the intrinsic viscosity.

TABLE V

| Example | $ZnEt_2$, g. | $ZnEt_2/TiCl_3$ mol ratio | Polymer, g. | Polymer g./$TiCl_3$ g./hour | n-Heptane Extraction Residue, percent | Yield Strength, kg./cm² | η |
|---|---|---|---|---|---|---|---|
| 12 | 0.03 | 0.125 | 59.8 | 74.8 | 93.6 | 241 | 5.8 |
| 13 | 0.06 | 0.250 | 64.9 | 81.1 | 94.6 | 250 | 5.5 |
| 14 | 0.12 | 0.500 | 70.4 | 88.0 | 94.0 | 264 | 4.7 |
| 15 | 0.36 | 1.50 | 58.3 | 72.9 | 93.2 | 277 | 3.3 |
| 16* | 0.03 | 0.125 | 59.1 | 73.9 | 95.3 | 252 | 6.5 |

* The instance when 0.085 g. of DC was used.

EXAMPLE 17–20

The procedures as described in Example 7 were followed to polymerize ethylene, except that the reaction was carried out at 70° C. using 250 ml. of the solvent and an ethylene pressure of 2–6 kg./cm.$^2$. The method of treating the polymer was the same as in the case when propylene was polymerized. The results obtained are shown in Table VI, below.

TABLE VI

| Example | TiCl$_3$, g. | TC, g. | DC, g. | ZnEt$_2$, g. | Polymerization Time, hr. | Polymer, g. | Specific Gravity | Stress at Breaking point, kg/cm.$^2$ |
|---|---|---|---|---|---|---|---|---|
| 17 | 0.32 | | | 0.12 | 3.0 | 3.6 | | |
| 18 | 0.32 | 0.25 | 0.4 | | 2.2 | 13.0 | | |
| 19 | 0.32 | 0.25 | 0.4 | 0.24 | 3.0 | 64.0 | 0.9381 | 402 |
| 20 | 0.32 | 0.25 | 0.4 | 0.06 | 2.0 | 28.5 | 0.9402 | 412 |

When dimethyl zinc was used instead of diethyl zinc in this experiment, the results obtained were exactly the same. On the other hand, when similar procedures were employed but using dibutyl zinc, the effects were about one half of that obtained with the use of either diethyl or dimethyl zinc.

EXAMPLES 21–25

The copolymerization of ethylene and propylene was carried out under identical conditions as in Example 1, except the polymerization reaction was conducted by the introduction of the gas of prescribed composition at an initial pressure of 4–5 kg./cm.$^2$, but with no further replenishment thereof. In the case of the three-component catalyst, the catalyst was prepared using the sequence of addition of the components of (DC-TC)–TiCl$_3$, while in the case where ZnEt$_2$ was added, the sequence was (DC-ZnEt$_2$)–TC-TiCl$_3$. Thus, the procedure used was one in which no consideration was given to the changes of the gas composition with the passage of time. The reaction was carried out at a temperature of 70° C. using 0.32 g. of TiCl$_3$(HA), 0.25 g. of TC and 0.4 g. of DC. The polymer was practically soluble in the solvent. This was diluted with methanol and the separating polymer was collected by filtration. The results obtained are shown in Table VII, below.

TABLE VII

| Example | ZnEt$_2$, g. | Ethylene Content of Gas Fed, percent | Initial Pressure, kg./cm.$^2$ | Reaction Time | Ethylene Content of Gas at Completion of Reaction, percent | Polymer, g. | Form | n-Heptane Extraction Residue, Percent |
|---|---|---|---|---|---|---|---|---|
| 21 | | 29.5 | 4.0 | 2.0 hr | | 4.4 | Rubbery | 10 |
| 22 | 0.12 | 29.5 | 5.1 | 5.1 hr | 3.4 | 14.0 | Bristly | 36.2 |
| 23 | 0.12 | 19.4 | 5.6 | 1.2 hr | 1.1 | 15.7 | do | 34.0 |
| 24 | 0.12 | 19.4 | 4.3 | 10 min | 2.1 | 8.5 | do | 20.0 |
| 25 | | 68.8 | 4.8 | 10 min | | 4.3 | Rubbery | 9 |

EXAMPLE 26

The same procedures as described in Example 7 were followed, the method of synthesizing the catalyst being one in which 0.4 g. of DC and 0.12 g. of ZnEt$_2$ were first reacted, then 0.32 g. (1.3 mmol) of (C$_5$H$_5$)$_2$Ti and TiCl$_3$ being added. The molar ratio of TC/TiCl$_3$ was 0.65. The so obtained catalyst was used to polymerize propylene. With a polymerization time of 2.5 hours, 85.5 g. of polypropylene were obtained. The polymerization time in this case becomes 112 g. polymer/g. catalyst/time. The resulting polypropylene had the following physical properties: a specific gravity of 0.9128, a melt index of 0.02, a yield strength of 262 kg./cm.$^2$, an n-heptane extraction residue of 93.3% and a shrinkage of 42%.

When titanium triiodide and tribromide were used instead of titanium trichloride, the yield declined and became about one half of that obtained by the use of the latter.

We claim:

1. A process for producing high polymers of alpha-olefins, which comprises effecting the polymerization reaction of at least one alpha-olefin in the presence of a catalyst obtained by reacting titanium trichloride, a polyalkylhydrosiloxane and dicyclopentadienyl titanium in such proportions that the titanium trichloride/dicyclopentadienyl titanium mole ratio ranges between about 2.0 and 0.2 and the polyalkylhydrosiloxane/dicyclopentadienyl titanium mole ranges between 1 and 10.

2. A process for producing high polymers of alpha-olefins, which comprises effecting the polymerization reaction of at least one alpha-olefin in the presence of a catalyst obtained by reacting titanium trichloride, a polyalkylhydrosiloxane, dicyclopenadienyl titanium and a dialkyl zinc of 1 to 4 carbon atoms, in such proportions that the titanium trichloride/dicyclopentadienyl titanium mole ratio ranges between about 2.0 and 0.2, the polyalkylhydrosiloxane/dicyclopenadienyl titanium mole ratio ranges between about 1 and 10, and the zinc metal/titanium metal mole ratio ranges between about 0.1 and 1.

3. The process according to claim 1 wherein said polymerization reaction is carried out in the presence of a hydrocarbon solvent.

4. The process according to claim 2 wherein said polymerization reaction is carried out in the presence of a hydrocarbon solvent.

5. A catalyst composition for use in polymerizing alpha-olefins comprising a mixture of titanium trichloride, a polyalkylhydrosiloxane and dicyclopentadienyl titanium in such proportions that the titanium trichloride/dicyclopentadienyl titanium mole ratio ranges between about 2.0 and 0.2 and the polyalkylhydrosiloxane/dicyclopentadienyl titanium mole ratio ranges between 1 and 10.

6. A catalyst composition for use in polymerizing alpha-olefins comprising a mixture of titanium trichloride, a polyalkylhydrosiloxane, dicyclopentadienyl titanium and a dialkyl zinc of 1 to 4 carbon atoms, in such proportions that the titanium trichloride/dicyclopentadienyl titanium mole ratio ranges between about 2.0 and 0.2, the polyalkylhydrosiloxane/dicyclopentadienyl titanium mole ratio ranges between about 1 and 10, and the zinc metal/titanium metal mole ratio ranges between about 0.1 and 1.

References Cited

UNITED STATES PATENTS

| 2,974,133 | 3/1961 | Wiberg et al. | 260—94.9 |
| 3,007,907 | 11/1961 | Robinson et al. | 260—94.9 |
| 3,202,617 | 8/1965 | Enk et al. | 252—429 |
| 3,208,985 | 9/1965 | Piekarski et al. | 260—92.8 |
| 3,227,702 | 1/1966 | Small et al. | 260—94.9 |

JOSEPH L. SCHOFER, *Primary Examiner.*

M. B. KURTZMAN, *Assistant Examiner.*